(12) United States Patent
Kanno et al.

(10) Patent No.: US 10,994,753 B2
(45) Date of Patent: May 4, 2021

(54) RAIL VEHICLE HAVING GUIDE DEVICE

(71) Applicant: MITSUBISHI HEAVY INDUSTRIES, LTD., Tokyo (JP)

(72) Inventors: Toshifumi Kanno, Tokyo (JP); Kouji Esaki, Tokyo (JP); Koshi Tanimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 372 days.

(21) Appl. No.: 16/080,242

(22) PCT Filed: Feb. 27, 2017

(86) PCT No.: PCT/JP2017/007530
§ 371 (c)(1),
(2) Date: Aug. 27, 2018

(87) PCT Pub. No.: WO2017/150462
PCT Pub. Date: Sep. 8, 2017

(65) Prior Publication Data
US 2019/0047596 A1    Feb. 14, 2019

(30) Foreign Application Priority Data
Feb. 29, 2016  (JP) .............................. JP2016-038051

(51) Int. Cl.
*B61F 9/00* (2006.01)
*B60B 17/00* (2006.01)
(Continued)

(52) U.S. Cl.
CPC ................ *B61F 9/00* (2013.01); *B60B 17/00* (2013.01); *B60B 17/0079* (2013.01);
(Continued)

(58) Field of Classification Search
CPC ....... B61F 9/00; B60B 17/00; B60B 17/0079; B61B 13/00; B62D 1/265
See application file for complete search history.

(56) References Cited

U.S. PATENT DOCUMENTS

| 2012/0103227 A1* | 5/2012 | Maeyama | ............. | B62D 1/265 |
| | | | | 104/245 |
| 2015/0000553 A1* | 1/2015 | Kimura | ................... | B61F 5/30 |
| | | | | 105/197.05 |

(Continued)

FOREIGN PATENT DOCUMENTS

| JP | 2879632 | 4/1999 |
| JP | 2011-88512 | 5/2011 |

(Continued)

*Primary Examiner* — Jason C Smith
(74) *Attorney, Agent, or Firm* — Wenderoth, Lind & Ponack, L.L.P.

(57) ABSTRACT

The rail vehicle has a guide device configured to guide traveling of a bogie on a traveling track by rolling guide wheels in a state of bringing the guide wheels into contact with guide rails installed on both sides of the traveling track in a vehicle width direction perpendicular to a traveling direction, wherein: the guide device has an arm and the guide wheels, the arm having a central portion fixed to a stationary member, extending to both sides in the vehicle width direction, and having both end portions elastically deformable in a direction in which the guide rails extend, the guide wheels being mounted on the arm at the both end portions of the arm in the vehicle width direction; and a center of each of the guide wheels is displaced from a center line of the arm, the center line extending in the vehicle width direction.

8 Claims, 2 Drawing Sheets

(51) Int. Cl.
*B61B 13/00* (2006.01)
*B62D 1/26* (2006.01)
(52) U.S. Cl.
CPC .............. *B61B 13/00* (2013.01); *B62D 1/265* (2013.01); *Y02T 10/86* (2013.01)

(56) References Cited

U.S. PATENT DOCUMENTS

| | | | |
|---|---|---|---|
| 2016/0023671 A1* | 1/2016 | Tachibana | B61F 5/38 105/216 |
| 2016/0052529 A1* | 2/2016 | Tachibana | B61B 13/00 105/215.1 |
| 2016/0207548 A1* | 7/2016 | Katahira | B61F 5/38 |
| 2016/0251002 A1* | 9/2016 | Katahira | B61F 5/38 105/182.1 |
| 2016/0272222 A1* | 9/2016 | Katahira | B61F 3/16 |
| 2016/0355059 A1* | 12/2016 | Katahira | B60C 7/00 |
| 2019/0047596 A1* | 2/2019 | Kanno | B61F 9/00 |

FOREIGN PATENT DOCUMENTS

| | | |
|---|---|---|
| JP | 5357696 | 12/2013 |
| JP | 5576990 | 8/2014 |
| JP | 2014-172543 | 9/2014 |

\* cited by examiner

RAIL VEHICLE HAVING GUIDE DEVICE

TECHNICAL FIELD

The present invention relates to a rail vehicle having a guide device, and is usefully applied to a case of driving a vehicle while guiding the vehicle along a traveling track by bringing guide wheels into contact with guide rails of the traveling track.

BACKGROUND ART

In recent years, rail vehicles that run with traveling wheels of rubber tires while a vehicle body is guided along a traveling track have been proposed. Patent Literature 1 discloses this kind of rail vehicle. A rail vehicle according to the conventional art disclosed in Patent Literature 1 is illustrated in FIG. 5. As illustrated in FIG. 5, the rail vehicle according to the conventional art includes a bogie 1 (a rear portion is not illustrated) supporting the vehicle body at each of the front (an upper portion of FIG. 5) and the rear (a lower portion of FIG. 5) with respect to a traveling direction Y, and travels along guide rails 3 on a predetermined traveling track 2. That is, the rail vehicle includes the guide rails 3 installed along the traveling track 2, respectively, on the left and the right in a vehicle width direction X perpendicular to the traveling direction Y, and guide wheels 5 mounted on a guide frame 4 of the bogie 1. The rail vehicle travels while being guided along the traveling track 2 by rolling the guide wheels 5 in a state of bringing the guide wheels 5 into contact with the guide rails 3.

The bogie 1 traveling on the traveling track 2 has an axle 6 extending in the vehicle width direction X, and traveling wheels 7 are rotatably mounted at both end portions of the axle 6. The guide frame 4 is pivotally fixed to the axle 6 through a pivot bearing 12 which pivots around a vertical axis using a center O as a pivot center. The axle 6 is fixed to the pivot bearing 12. Therefore, the axle 6 pivotably supports the guide frame 4 through the pivot bearing 12. In addition, the guide frame 4 has two longitudinal beams 8 extending in the traveling direction Y and two lateral beams 9 extending in the vehicle width direction X. More specifically, the longitudinal beams 8 are structured so as to extend in the traveling direction on the left and the right of the center O with respect to the vehicle width direction X, and the lateral beams 9 are structured so as to extend in the vehicle width direction X in front of and behind the center O with respect to the traveling direction Y.

Two guide arms 10 extending in the vehicle width direction X are provided at both end portions of each lateral beam 9 in the vehicle width direction X, and each guide wheel 5 that rolls in a state in which it comes into contact with the guide rail 3 during traveling is mounted on the guide arm 10 so as to be swingable through a rotation shaft 11. Therefore, when the guide wheel 5 is in contact with the guide rail 3 due to movement of the bogie 1 in the vehicle width direction X upon traveling of the rail vehicle, a rotation center of the guide wheel 5 swings in a clockwise direction or in a counterclockwise direction around a swing center which is the rotation shaft 11. Such swing of the guide wheel 5 is performed against an energizing force by an elastic member (not illustrated), or the like, directing to an opposite side of a swing direction. That is, the guide wheel 5 is mounted on the guide arm 10 through a shock absorber (not illustrated).

The reason is that the shock absorber absorbs a shock when the guide wheel 5 comes into contact with the guide rail 3.

CITATION LIST

Patent Literature

Patent Literature 1: JP 2011-88512 A

SUMMARY OF INVENTION

Technical Problem

The guide device in the rail vehicle disclosed in Patent Literature 1 includes the longitudinal beams 8, the lateral beams 9, the guide arms 10, the rotation shafts 11, the guide wheels 5, and the like. In the rail vehicle, in order to reduce an excessive shock load when the guide wheel 5 and the guide rail 3 are in contact with each other and to reduce deterioration of ride comfort caused by the shock load, the guide frame 4 is formed as a rigid structure with the longitudinal beams 8 and the lateral beams 9 formed by combining pipes and/or welded steel materials having a box-shaped cross section with each other in a lattice shape. In addition, the guide wheels 5 are mounted at both ends of the lateral beams 9 through the guide arms 10 and the shock absorbers. That is, each guide wheel 5 and shock absorber are formed in a cantilever structure by the lateral beam 9. As a result, a large load caused by weights of the guide wheel 5 and the shock absorber acts on the tip of the lateral beam 9. Because of this and a vibration load in a vertical direction acting on the lateral beam 9 by a vibration load caused by ruggedness, or the like, of a road surface of the traveling track 2, stress acting on a central portion of the lateral beam 9 becomes large. Therefore, it is demanded to sufficiently increase strength of the guide frame 4 in order to resist such large stress. For this reason, the size of the guide frame 4 is increased. As a result, the weight of the guide frame 4 is increased.

In addition, regarding the ride comfort of the rail vehicle, vehicle vibrations caused by the ruggedness of the road surface of the traveling track 2 are an important factor. Particularly, a case where the traveling wheel 7 is a rubber tire is considered to be a vibration problem of a two-degree of freedom system including a weight of the vehicle body (not illustrated) and a weight of the bogie 1, a spring (an air spring, a coil spring, or the like) between the vehicle body and the bogie 1, and the rubber tire. In such a case, there is a need to reduce vibrations of a vehicle body portion. For this reason, it is important to reduce a load below the spring, that is, to reduce the weight of the bogie including the guide device.

The present invention has been made in view of the abovementioned problems of the conventional techniques, and an object of the present invention is to provide a rail vehicle having a guide device capable of contributing to improvement in ride comfort by reducing the weight of the guide device.

Solution to Problem

1) According to the present invention that attains the above-mentioned object, there is provided a rail vehicle having a guide device, the guide device being configured to guide traveling of a bogie on a traveling track by rolling guide wheels in a state of bringing the guide wheels into contact with guide rails installed on both sides of the traveling track in a vehicle width direction perpendicular to a traveling direction, wherein: the guide device has an arm and the guide wheels, the arm having a central portion fixed to a stationary member, extending to both sides in the vehicle width direction, and being elastically deformable, the guide wheels being mounted at both end portions of the arm in the vehicle width direction; and a center of each of the guide wheels is displaced from a center line of the arm, the center line extending in the vehicle width direction.

According to the present invention, when the guide wheels come into contact with the guide rails, a reaction force at the time of the contact between the guide wheels and the guide rails acts on the arm along the vehicle width direction through the guide wheels. Here, since a center of the arm is displaced with respect to the center line of the arm in the vehicle width direction, the reaction force acts as a bending moment on a fixing point of the arm in the stationary member. In addition, since the arm is elastically deformable, the arm is bent with respect to a support point by the action of the reaction force. As a result, the reaction force is absorbed by the bend of the elastically deforming arm. That is, according to the present invention, it is possible to absorb a collision load due to the contact between the guide wheels and the guide rails by the elastic deformation of the arm without providing the shock absorber as in Patent Literature 1. Therefore, it is possible to reduce the weight of an arm portion.

2) In the present invention, the arm may have a continuous shape from the both end portions toward the central portion through a bent portion, such that a displacement amount of the center of each of the guide wheels due to the displacement with respect to a center line of the central portion is smaller than that of the center of each of the guide wheels due to the displacement with respect to a center line of the both end portions.

In this case, since the arm has a shape in which the both end portions and the central portion are continuous through the bent portion so that the displacement amount becomes small, it is possible to decrease a bending moment acting on a support point of the central portion of the arm.

3) In the present invention, two of the arms may be fixed, respectively, to two places of a front and a rear of the stationary member in the traveling direction.

In this case, it is possible to reduce a dimension of the stationary member along the traveling direction, such that a reduction in the size and the weight of the stationary member can be realized.

4) In the present invention, it is preferable that a transverse section of the arm is a rectangular shape, and short sides of the rectangular shape are arranged along the traveling direction and long sides of the rectangular shape are arranged along a vertical direction. In this case, since a dimension of the arm along the traveling direction in the shape of the transverse section of the arm is small, the arm is easily bent in the traveling direction. As a result, a shock load due to the contact between the guide wheel and the guide rail can be absorbed well by the elastic deformation of the arm. On the other hand, since a dimension of the arm along the vertical direction is large, the arm has great rigidity against vibrations that are in the vertical direction and are transferred to the bogie through a traveling wheel during traveling.

5) In the present invention, it is preferable that a transverse section of the arm is an I-shape in which a width of each of flange portions of horizontal upper and lower ends of the I-shape is smaller than a dimension of a central portion extending in a vertical direction between the flange portions. In this case, a reduction in the weight of the arm can also be realized together with the action and effect of the above-mentioned 4).

6) In the present invention, it is preferable that the arm is formed of a fiber reinforced plastic (FRP). In this case, a reduction in the weight of the guide device can be realized by the reduction in the weight of the arm, together with a predetermined strength of the arm.

Advantageous Effects of Invention

In the rail vehicle according to the present invention, since the centers of the guide wheels are mounted on both end portions of the arm so as to be displaced from a central axis of the arm in the vehicle width direction, the bend of the arm can absorb a shock when the guide wheels come into contact with the guide rails. As a result, shock absorbers need not to be provided at the both end portions of the arm, and a reduction in the weight of the arm portion is able to contribute to a reduction in the weight of the guide device. Therefore, the weight of the bogie can be reduced, such that it is possible to profitably reduce vibrations of a vehicle body portion and the ride comfort can also be improved.

DESCRIPTION OF EMBODIMENTS

Hereinafter, embodiments of the present invention will be described with reference to the drawings.

Each of the following embodiments is only an example, and there is no intention to exclude the application of various modifications and techniques that are not explicitly stated in the following embodiments. The respective configurations according to the following embodiments are able to be variously modified without departing from their spirits, and are able to be selected as needed or are able to be appropriately combined with each other.

First Embodiment

Figure 1:
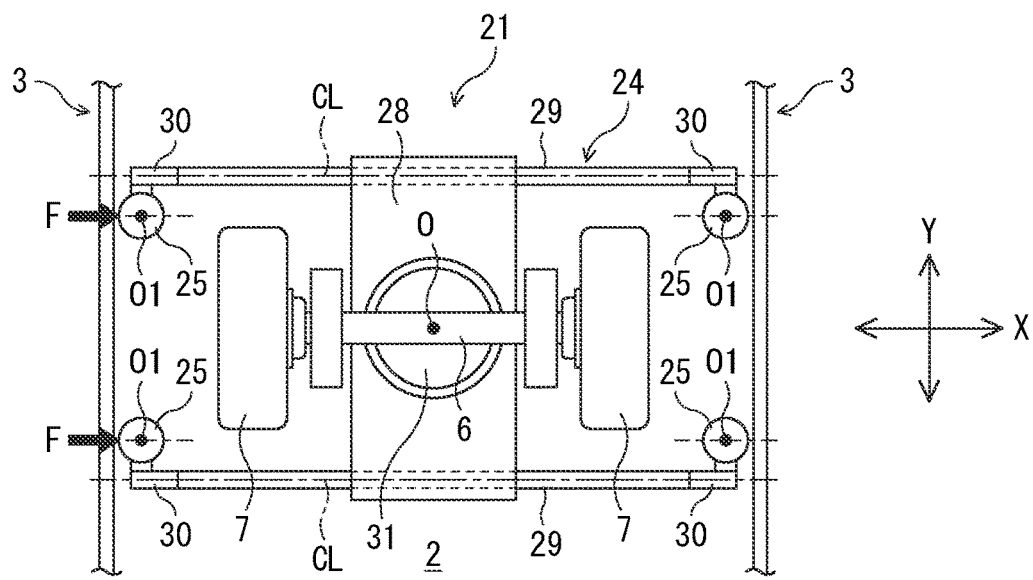
FIG. 1 is a plan view illustrating a bogie of a rail vehicle according to a first embodiment of the present invention.

FIG. 1 is a plan view illustrating a bogie of a rail vehicle according to a first embodiment of the present invention. As illustrated in FIG. 1, the rail vehicle according to the present embodiment includes a bogie 21 (of which a rear portion is not illustrated) supporting a vehicle body (not illustrated) through springs (not illustrated) at a front portion and a rear portion of the vehicle body with respect to a front-and-rear direction Y of the vehicle. The front-and-rear direction Y conforms to a traveling direction of the vehicle. The rail vehicle travels along guide rails 3 on a predetermined traveling track 2.

The bogie 21 includes a stationary member 28 and guide devices 24 including guide wheels 25 and arms 29 fixed to the stationary member 28. Here, a pivot bearing 31 is mounted on the stationary member 28 so as to be pivotable around a vertical axis using a center O as a pivot center. Therefore, the guide device 24 is mounted on the stationary member 28 through the pivot bearing 31 so as to be pivotable around the vertical axis. An axle 6 extending in a vehicle width direction X is fixed to the pivot bearing 31. As a result, the guide device 24 is mounted on the axle 6 through the pivot bearing 31. A pair of traveling wheels 7 are steerably mounted at both end portions of the axle 6 in the vehicle width direction X so as to be symmetrical to each other with respect to the center O. Here, although not illustrated, tires 7 and the stationary member 28 are connected to each other through steering rods. As a result, steering through the tire 7 becomes possible.

The arm 29 has a central portion fixed to the stationary member 28, extends to both sides in the vehicle width direction X, and is formed to be elastically deformable in the front-and-rear direction of the traveling direction Y. The guide wheels 25 are mounted at both end portions of the arm 29 through guide arms 30, and are rotatable and swingable in the traveling direction Y in response to the elastic deformation of the arm 29 in the traveling direction Y. Here, a center O1 of each of the guide wheels 25 is displaced from a center line CL of the arm 29 extending in the vehicle width direction X. In addition, in the present embodiment, the central portions of two arms 29 are fixed, respectively, to the stationary member 28 at two places of a front portion (an upper portion in FIG. 1) and a rear portion (a lower portion in FIG. 1) as compared with the center O in the traveling direction Y.

The guide wheels 25 are mounted at the both end portions of the arm 29 through the guide arms 30 in the present embodiment, but the guide wheels 25 may be directly mounted on the arm 29 at the both end portions of the arm 29 without using the guide arms 30. When the guide wheels 25 are directly mounted on the arm 29, there is an advantage that the weight of the guide device 24 can be reduced. On the other hand, in the present embodiment, the center of each of the guide wheels 25 is displaced from the center line CL of the arm 29, and thus, in order to mount the guide wheels 25 directly on the arm 29, there is a problem that tips of the arm 29 need to be bent toward the front or the rear in the traveling direction Y. The above-mentioned problem can be solved suitably by mounting the guide wheels 25 on the arm 29 through the guide arms 30.

Figure 2:
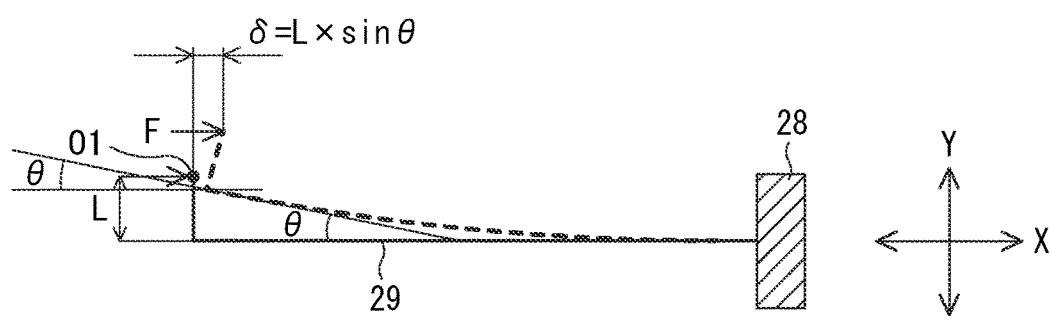
FIG. 2 is a schematic diagram illustrating an arm portion of a guide device for describing an operation according to the first embodiment of the present invention.

According to the present embodiment, when the guide wheels 25 come into contact with the guide rails 3, a reaction force due to a collision load at the time of the contact between the guide wheels 25 and the guide rails 3 acts on the arm 29 along the vehicle width direction X through the guide wheels 25. Here, in the present embodiment, the center of the arm 29 is displaced with respect to the center line CL of the arm 29 in the vehicle width direction X. Therefore, a reaction force against the guide wheels 25 acts as a bending moment on the arm 29 fixed to the stationary member 28. Here, since the arm 29 is elastically deformable, the arm 29 is bent by the action of the reaction force using a fixing point of the stationary member 28 as a fulcrum. Accordingly, the reaction force is absorbed by the bend of the elastically deforming arm 29. That is, as illustrated in FIG. 2, where a displacement amount of the center O1 of the guide wheel 25 with respect to the centroid (center) of the arm 29 is L, a bending angle of the tip of the arm 29 is θ, and a displacement amount of the guide wheel 25 in a load direction is δ, δ=L×sinθ. Therefore, when the guide wheel 25 comes into contact with the guide rail 3, causing the reaction force on the guide wheel 25, the arm 29 is bent in the traveling direction, such that the center O1 of the guide wheel 25 is displaced by δ in the vehicle width direction X, that is the load direction. As a result, a reaction force F in the vehicle width direction X based on the collision load generated when the guide wheel 25 comes into contact with the guide rail 3 is absorbed by the elastic deformation of the arm 29. That is, the arm 29 functions as a shock absorber for the reaction force F caused by the collision load.

Figure 3A:
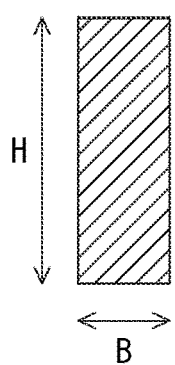
FIGS. 3A and 3B are cross-sectional views illustrating shapes of transverse sections of arms according to the first embodiment of the present invention.
Figure 3B:
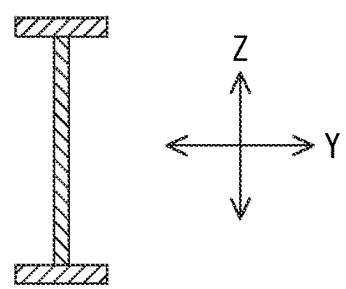

In the present embodiment, it is preferable to decrease flexural rigidity EI in order to improve a shock absorbing function of the arm 29, while it is preferable to increase a section modulus Z in order to secure strength against the collision load. That is, it is preferable that the arm 29 has member characteristics that maximize (section modulus Z/flexural rigidity EI). Here, as illustrated in FIGS. 3A and 3B, where a dimension of the arm 29 in the traveling direction Y is B, Max(Z/EI)=Max(2/EB). That is, in terms of decreasing the flexural rigidity EI while securing the strength, it is desirable that the dimension B of the section of the arm is small. Assuming that the "I", which is determined in consideration of the demanded shock absorbing function, is a fixed value, the dimension B of a rectangular section is smaller than that of an I-shaped section.

Therefore, as illustrated in FIG. 3A, the arm 29 according to the present embodiment is formed to have a transverse section being a rectangular shape in which each of the short sides having the dimension B extend along the traveling direction Y and each of the long sides having a dimension H extends along a vertical direction. As described above, in the present embodiment, since the dimension B of the arm 29 along the traveling direction Y in the shape of the transverse section of the arm 29 is small, the arm 29 is easily bent in the traveling direction Y. As a result, a shock load due to the contact between the guide wheel 25 and the guide rail 3 can be absorbed well by the elastic deformation of the arm 29. On the other hand, since the dimension H of the arm 29 along the vertical direction is large, the arm 29 has great rigidity against vibrations that are transferred to the bogie 21 through the traveling wheel 7 and act on the bogie 21 being displaced in the vertical direction Z during traveling.

In the case of attempting to reduce the weight of the arm 29, as illustrated in FIG. 3B, it is effective to form the transverse section of the arm 29 in an I-shape. This means to form an I-shape, such that a width of each of flange portions at horizontal upper and lower ends of the I-shape is smaller than a dimension of a central portion extending in the vertical direction between the flange portions. As a result, the same action and effect as those of the arm 29 having the shape of the transverse section illustrated in FIG. 3A can be obtained and the reduction in the weight of the arm 29 can be achieved concurrently.

An elastic material exhibiting a predetermined elastic deformation, for example, a metal such as steel may be basically used as a material of the arm 29, but a fiber reinforced plastic (FRP), which is a material having demanded elasticity and strength and being lightweight, is optimal. Here, any material depending on elasticity and strength requirements, such as a reinforced fiber or a carbon fiber, is usable. In addition, any combinations of such materials are also applicable. In this case, a reduction in the weight of the guide device 24 due to a reduction in the weight of the arm 29 together with predetermined strength and elasticity can be realized, contributing to improvement in ride comfort of the rail vehicle.

Second Embodiment

Figure 4:
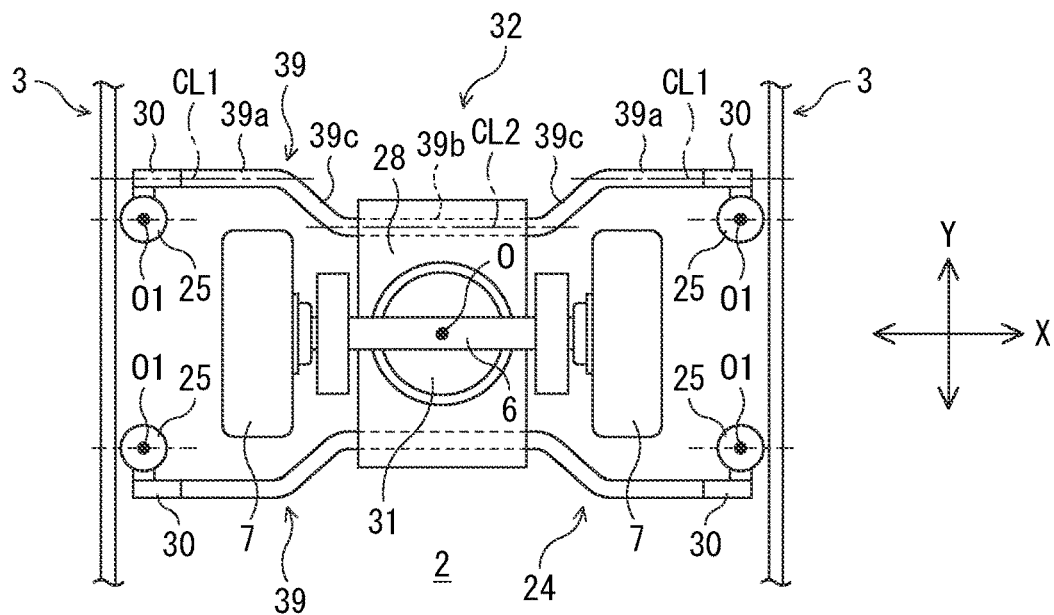
FIG. 4 is a plan view illustrating a bogie of a rail vehicle according to a second embodiment of the present invention.
Figure 5:
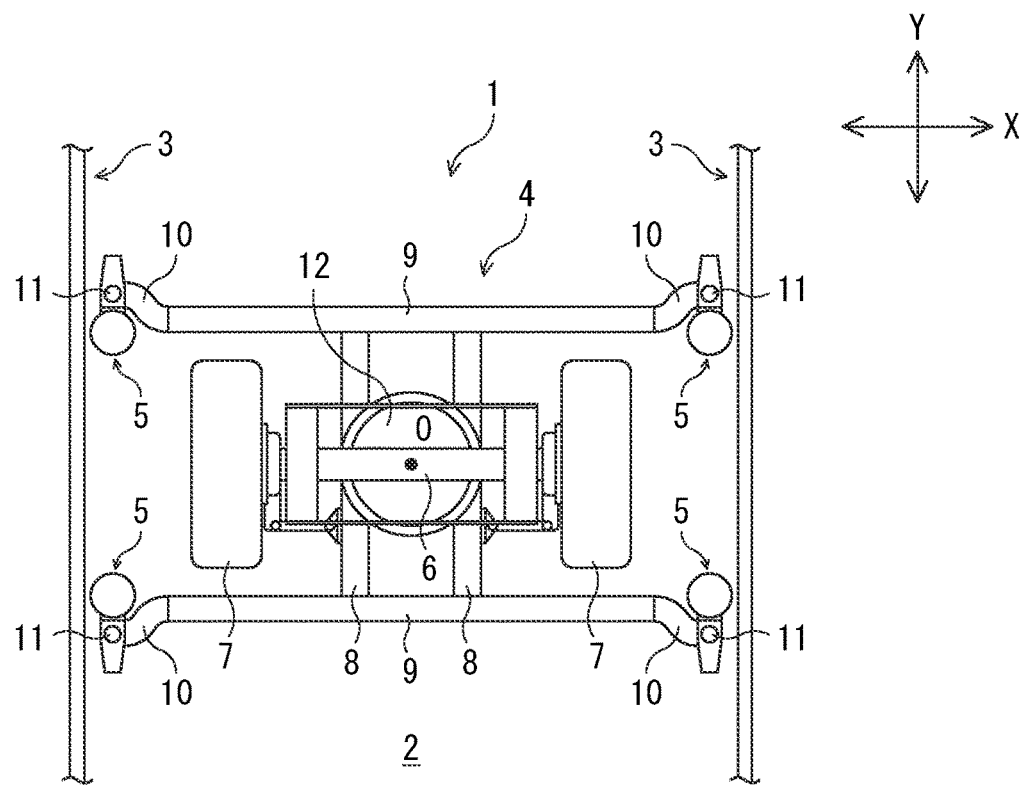
FIG. 5 is a plan view illustrating a bogie of a rail vehicle according to a conventional art.

FIG. 4 is a plan view illustrating a bogie of a rail vehicle according to a second embodiment of the present invention.

In FIG. 4, the same portions as those in FIG. 1 are denoted by the same reference numerals, and repetitious descriptions are omitted.

An arm 39 of a bogie 32 according to the present embodiment has a continuous shape from both end portions 39a toward a central portion 39b through a bent portion 39c. With this configuration, a displacement amount of the center O1 of each the guide wheel 25 due to the displacement with respect to a center line CL2 of the central portion 39b is set smaller than a displacement amount of the center O1 of each guide wheel 25 due to the displacement with respect to a center line CL1 of the both end portions 39a.

According to the present embodiment, the displacement amount of the center 01 of each guide wheel 25 with respect to the center line CL2 of the central portion 39b of the arm 39 is smaller than that with respect to the center line CL1 of the both end portions 39a of the arm 39, such that it is possible to reduce a bending moment acting on a support point at the central portion of the arm 39.

In addition, according to the present embodiment, it is possible to reduce an interval along the traveling direction Y between the central portions 39b of two arms 39 arranged at two places in the traveling direction Y and fixed to the stationary member 28. As a result, a reduction in the size and the weight of the stationary member 28 can be realized.

Others

In the above-mentioned embodiment, the guide device 24 including the arm 29 or 39 and the guide wheels 25 is provided at each of the front and the rear of the stationary member 28, and a reduction in the weight of each guide device 24 can be greatly promoted. However, even when the guide device 24 is applied to only one of the front and the rear of the stationary member 28, the reduction in the weight can be achieved.

REFERENCE SIGNS LIST

X: Traveling direction
Y: Vehicle width direction
O1: Center
CL, CL1, CL2: Center line
2: Traveling track
3: Guide rail
4: Guide frame
6: Axle
7: Traveling wheel
21, 32: Bogie
24: Guide device
25: Guide wheel
28: Stationary member
29, 39: Arm
39a: Both end portions
39b: Central portion
39c: Bent portion

The invention claimed is:

1. A rail vehicle having a guide device,
the guide device having rolling guide wheels and being configured to guide traveling of a bogie on a traveling track by the rolling guide wheels in a state of bringing the guide wheels into contact with guide rails installed on both sides of the traveling track in a vehicle width direction perpendicular to a traveling direction, wherein:
the guide device has an arm, the arm having a central portion fixed to a stationary member, the arm extending to both sides in the vehicle width direction, both end portions of the arm in the vehicle width direction being elastically deformable in a front-and-rear direction in which the guide rails extend, the guide wheels being mounted on the arm at the end portions of the arm, respectively;
a position of a rotation center of each of the guide wheels in the front-and-rear direction is displaced from a center line of the arm, the center line extending in the vehicle width direction; and
a transverse section of the arm has a rectangular shape, and short sides of the rectangular shape extend along the traveling direction and long sides of the rectangular shape extend along a vertical direction.

2. The rail vehicle having the guide device according to claim 1, wherein the arm has a continuous shape from each of the end portions toward the central portion through a respective bent portion, such that a displacement amount of the rotation center of each of the guide wheels with respect to a center line of the central portion is smaller than that of the rotation center of each of the guide wheels with respect to a center line of the end portions.

3. The rail vehicle having the guide device according to claim 1, wherein two of the arms are fixed, respectively, at a front location and a rear location of the stationary member in the traveling direction.

4. The rail vehicle having the guide device according to claim 1, wherein the arm is formed of a fiber reinforced plastic.

5. A rail vehicle having a guide device,
the guide device having rolling guide wheels and being configured to guide traveling of a bogie on a traveling track by the rolling guide wheels in a state of bringing the guide wheels into contact with guide rails installed on both sides of the traveling track in a vehicle width direction perpendicular to a traveling direction, wherein:
the guide device has an arm, the arm having a central portion fixed to a stationary member, the arm extending to both sides in the vehicle width direction, both end portions of the arm in the vehicle width direction being elastically deformable in a front-and-rear direction in which the guide rails extend, the guide wheels being mounted on the arm at the end portions of the arm, respectively;
a position of a rotation center of each of the guide wheels in the front-and-rear direction is displaced from a center line of the arm, the center line extending in the vehicle width direction; and
a transverse section of the arm has an I-shape in which a central portion extends in a vertical direction between two flange portions, the flange portions extending in a horizontal direction at upper and lower ends of the central portion, respectively, and in which a width of each of the flange portions is smaller than a dimension of the central portion in the vertical direction.

6. The rail vehicle having the guide device according to claim 5, wherein the arm has a continuous shape from each of the end portions toward the central portion through a respective bent portion, such that a displacement amount of the rotation center of each of the guide wheels with respect to a center line of the central portion is smaller than that of the rotation center of each of the guide wheels with respect to a center line of the both end portions.

7. The rail vehicle having the guide device according to claim 5, wherein two of the arms are fixed, respectively, at a front location and a rear location of the stationary member in the traveling direction.

8. The rail vehicle having the guide device according to claim 5, wherein the arm is formed of a fiber reinforced plastic.

* * * * *